United States Patent [19]

Gancy et al.

[11] 4,044,097

[45] Aug. 23, 1977

[54] RECOVERY OF SODA VALUES FROM SODIUM CARBONATE CRYSTALLIZER PURGE LIQUORS

[75] Inventors: Alan B. Gancy; Rustom P. Poncha, both of Syracuse, N.Y.

[73] Assignee: Allied Chemical Corporation, Morris Township, N.J.

[21] Appl. No.: 723,681

[22] Filed: Sept. 16, 1976

Related U.S. Application Data

[62] Division of Ser. No. 587,581, June 17, 1976, Pat. No. 3,991,160.

[51] Int. Cl.$^2$ .................................................. C01D 7/24
[52] U.S. Cl. ................................... 423/186; 23/302 T; 423/206 T; 423/207; 423/208; 423/421
[58] Field of Search ............ 423/421, 206 T, 184, 423/207, 208; 23/302 T

[56] References Cited

U.S. PATENT DOCUMENTS

| | | | |
|---|---|---|---|
| 3,655,331 | 4/1972 | Seglin et al. | 423/206 T |
| 3,838,189 | 9/1974 | Sopchak et al. | 423/206 T |
| 3,870,780 | 3/1975 | Guptill | 423/206 T |
| 3,933,977 | 1/1976 | Ilardi et al. | 423/206 T |

OTHER PUBLICATIONS

Kirk–Othmer, Encyclopedia of Chemical Technology, vol. 12, Second Edition.

*Primary Examiner*—O. R. Vertiz
*Assistant Examiner*—Wayne A. Langel
*Attorney, Agent, or Firm*—Gerhard H. Fuchs; Gerard P. Rooney

[57] ABSTRACT

Soda values from the crystallizer mother liquor purge in the process of making sodium carbonate from trona are recovered by (1) mixing the purge with treating agent of magnesium oxide, aluminum oxide, bauxite, certain fine particle size calcined trona, insoluble impurities obtained in the trona-soda ash process, or mixtures thereof, (2) evaporating the resulting mixture to dryness and calcining it to insolubilize soluble silicates and to reduce contamination with carbonaceous impurities, and (3) leaching the calcined mixture with water or aqueous sodium carbonate solution.

6 Claims, No Drawings

RECOVERY OF SODA VALUES FROM SODIUM CARBONATE CRYSTALLIZER PURGE LIQUORS

This is a division of application Ser. No. 587,581 filed June 17, 1976, now U.S. Pat. No. 3,991,160.

BACKGROUND OF THE INVENTION

Trona deposits in Sweetwater and adjacent counties in Wyoming are found at depths of about 1500 feet underground and consist of a main trona bed varying from 8 to 10 feet in thickness. The trona consist mainly of sodium sesquicarbonate ($Na_2CO_3 \cdot NaHCO_3 \cdot 2H_2O$) containing about 3 to 15% or, more generally, 5 to 10% of insoluble impurities, mainly shale.

A typical natural trona composition is given below:

| | |
|---|---|
| $Na_2CO_3$ | 41.8% |
| $NaHCO_3$ | 33.1% |
| $H_2O$ | 14.1% |
| | 89.0% |
| Insolubles: | |
| Dolomite $CaCO_3$, $MgCO_3$ | 5.5% |
| Quartz $SiO_2$ | 1.1% |
| Feldspar: $(K,Na)_2O$. $Al_2O_3 \cdot ySiO_2 \cdot zH_2O$ | 3.3% |
| Clay: $2K_2O \cdot 2MgO \cdot 8Fe_2O_3 \cdot 24SiO_2 \cdot 12H_2O$ | 0.6% |
| Shortite: $Na_2CO_3 \cdot 2CaCO_3$ | 0.1% |
| Carbonaceous Matter, as Elemental Carbon | 0.2% |
| Other (by Difference) | 0.2% |

In the production of sodium carbonate from natural trona, it is usual procedure to calcine the trona at elevated temperature to obtain crude sodium carbonate:

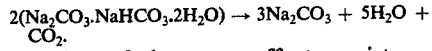

$$2(Na_2CO_3 \cdot NaHCO_3 \cdot 2H_2O) \rightarrow 3Na_2CO_3 + 5H_2O + CO_2.$$

Calcination of the trona effects moisture removal, reduction or elimination of organic matter as well as transformation of the sodium sesquicarbonate to sodium carbonate. However, calcination at elevated temperature also causes sodium carbonate to react with silica contained in the trona to form soluble silicates. The quantity of soluble silicates so formed increases materially with increase in calcination temperature. Soluble silicates are a major impurity in solutions obtained by dissolving calcined trona and, unless steps are taken to reduce soluble silicate content of such solutions, soluble silicates become a significant impurity in soda ash prepared from trona.

Further, the trona contains carbonaceous matter which is at least partially soluble in the sodium carbonate process liquors. These carbonaceous impurities detrimentally affect the geometrical physical properties of the sodium carbonate obtained from these liquors. To avoid these difficulties, it is usual practice to contact the sodium carbonate process liquors with activated carbon to selectively absorb the carbonaceous matter therefrom. Still, not all of the critical carbonaceous habit modifiers respond favorably to the activated carbon treatment.

Levels of soluble silicate and carbonaceous impurities in sodium carbonate mother liquors derived from trona usually are controlled or maintained by purging part of the mother liquor. This, of course, entails loss of valuable soda values and poses a disposal problem.

It has already been proposed to reduce soluble silicate levels in aqueous solutions of sodium carbonate obtained by dissolving calcined trona in aqueous media by digesting the solutions at elevated temperature above about 160° F. for time sufficient to substantially reduce the soluble silicates contained therein. Apparently, there is some interaction between the insoluble impurities and the soluble silicates in such solutions, rendering insoluble or absorbing the soluble silicates to reduce their concentration in the solution on digestion.

In our co-pending U.S. application Ser. No. 587,585 filed of even date herewith, there is described an improvement in the process of making sodium carbonate from trona by the method involving crushing the trona, calcining it and dissolving it in an aqueous medium for purification by crystallization, which improvement results in reduction of silicate contamination of the crystallization liquor and which improvement involves (a) segregating the calcined trona into a coarse and fine particle size fraction; (b) separately dissolving the coarse and fine particle size fractions to obtain aqueous solutions of sodium carbonate, sodium silicates and insoluble impurities; followed by (c) digesting the solution of the fine particle size fraction at elevated temperature to insolubilize soluble silicates, and separating the digested solution from insoluble impurities.

Further, in our co-pending U.S. application Ser. No. 587,575 filed of even date herewith there is described a method for reducing soluble silicate content of crystallizer mother liquor used in the process for making sodium carbonate from trona from which liquor sodium carbonate precursor crystals are obtained by evaporative crystallization, which method comprises (1) digesting the mother liquor at elevated temperature for time sufficient to reduce soluble silicates in the presence, as treating agent, of insolubles which have been obtained by calcination of crushed trona, segregation of a fine particle size fraction from the calcined trona, dissolution of said fine particle size fraction in an aqueous medium to obtain a solution comprising sodium carbonate and insolubles followed by separating insolubles and (2) separating the insolubles from the digested mother liquor, and recycling the mother liquor to the process.

SUMMARY OF THE PRESENT INVENTION

In accordance with the present invention, there is provided a method for recovering soda values from aqueous carbonate process crystallizer mother liquor purge, containing soluble silicate and carbonaceous impurities, from the process for making sodium carbonate precursor crystals, which method comprises (a) mixing the mother liquor purge with from 0.001 to 10 parts by weight, per part of mother liquor purge, of treating agent selected from the group consisting of (1) magnesium oxide, (2) aluminum oxide, (3) bauxite, (4) fine particle size calcined trona which has been obtained by calcination of trona at temperatures of from 125° to 600° C. and segregation of a fine particle size fraction therefrom substantially passing through 60 mesh screen (Tyler), (5) insoluble impurities obtained by crushing crude trona, calcining the crushed trona, dissolving the calcined trona comprising sodium carbonate and insoluble impurities in an aqueous medium followed by separation of insoluble impurities, and (6) any mixture thereof; (b) evaporating the mixture to dryness and calcining it at temperatures of from 300° to 600° C. for time sufficient to insolubilize soluble silicates and to reduce contamination with carbonaceous impurities; and (c) leaching the calcined mixture with water or aqueous sodium carbonate solution to recover sodium carbonate values therefrom.

In one specific embodiment, the mother liquor purge is mixed with 0.5 to 5 parts by weight per part of mother liquor purge of fine particle size calcined trona which has been obtained by calcination of trona at temperatures of from 125° to 600° C., and by segregation of a fine particle size fraction therefrom passing substantially through 60 mesh screen (Tyler), and, optionally, together with 0.1 to 10% by weight, based on the weight of the sodium carbonate in the mother liquor purge, of magnesium oxide, followed by calcination of the mixture and leaching of the calcined mixture, as above described.

In another specific embodiment the mother liquor purge is mixed with about 1 to 10 parts by weight per part of mother liquor purge of insoluble impurities obtained by (a) crushing crude trona, (b) calcining the crushed trona, (c) dissolving the calcined trona comprising sodium carbonate and insoluble impurities in an aqueous medium, followed by (d) separation of insoluble impurities, together with 0.1 to 2 percent by weight, based on the weight of the mother liquor purge, of bauxite, followed by calcination of the mixture and leaching of the calcined mixture, as above described. We have made the surprising discovery that such insoluble impurities and bauxite synergistically co-act to insolubilize soluble silicates by the invention method so that relatively small amounts of treating agent effect relatively large reduction of soluble silicates.

In a further specific embodiment, the aqueous carbonate process mother liquor purge is first subjected to cooling and/or evaporation to effect crystallization of sodium carbonate precursor crystals therefrom, which crystals are separated from the mother liquor and which mother liquor is then mixed with from 0.001 to 10 parts by weight per part of mother liquor of treating agent selected from the group consisting of (1) magnesium oxide, (2) aluminum oxide, (3) bauxite, (4) fine particle size calcined trona which has been obtained by calcination of trona at temperatures of from 125° to 600° C., followed by segregation of a fine particle size fraction therefrom substantially passing through 60 mesh screen (Tyler), and (5) insoluble impurities obtained by crushing crude trona, calcining the crushed trona, dissolving the calcined trona comprising sodium carbonate and insoluble impurities in an aqueous medium followed by separation of insoluble impurities, and (6) any mixture thereof, followed by calcination of the mixture and leaching of the calcined mixture, as above described. In this specific embodiment, it is particularly desirable to crystallize sodium carbonate from the mother liquor purge as sodium carbonate monohydrate and, especially, sodium carbonate decahydrate crystals, and then to treat the resultant mother liquor with 0.5 to 10 parts by weight per part of mother liquor of the above-described fine particle size calcined trona and, optionally, together with 0.1 to 10% by weight, based on the weight of the mother liquor, of magnesium oxide, followed by calcination of the mixture and leaching of the calcined mixture, as above described.

In a still further specific embodiment, the aqueous carbonate process crystallizer mother liquor purge is first mixed with 0.001 to 1 parts by weight per part of mother liquor purge of treating agent selected from the group consisting of (1) magnesium oxide, (2) aluminum oxide, (3) bauxite, (4) fine particle size calcined trona which has been obtained by calcination of trona at temperature of from 125° to 600° C. and segregation of the fine particle size fraction therefrom substantially passing through 60 mesh screen (Tyler), (5) insoluble impurities obtained by crushing crude trona, calcining the crushed trona, dissolving the calcined trona comprising sodium carbonate and insoluble impurities in an aqueous medium and separation of insoluble impurities and (6) any mixture thereof. The mixture is evaporated to dryness and is then calcined at temperature of from 300° to 600° C. for time sufficient to insolubilize soluble silicates and to reduce contamination with carbonaceous impurities, followed by leaching the calcined mixture with water or aqueous sodium carbonate solution. The leach liquor is then subjected to cooling and/or evaporation to effect crystallization of sodium carbonate precursor crystals therefrom, and especially of sodium carbonate decahydrate crystals, which may be obtained in substantially pure form. In this particular specific embodiment, then aqueous carbonate process mother liquor purge is desirably, prior to evaporation to dryness and calcination, mixed with 0.5 to 5 parts by weight per part of mother liquor purge of above described insoluble impurities together with 0.1 to 2.0% by weight, based on the weight of the mother liquor purge, of bauxite, or, alternatively, with 0.5 to 10 parts by weight per part of mother liquor purge of the above described fine particle size calcined trona and, optionally, together with 0.1 to 10% by weight, based on the weight of the mother liquor purge, of magnesium oxide.

Sodium carbonate precursor crystals for purposes of the present invention are those selected from the group consisting of sodium bicarbonate, sodium sesquicarbonate, anhydrous sodium carbonate, sodium carbonate monohydrate, sodium carbonate heptahydrate and sodium carbonate decahydrate.

DETAILED DESCRIPTION OF THE INVENTION AND OF THE PREFERRED EMBODIMENTS

The sodium sesquicarbonate content of naturally occurring trona can be simply transformed into sodium carbonate by calcining the trona. However, sodium carbonate obtained by calcining trona is not of sufficient purity to serve as raw material in the various applications which soda ash is used, e.g. making glass. Several processes for obtaining pure sodium carbonate from crude trona have been described. Generally, these can be classified into the sodium sesquicarbonate crystallization processes and the sodium carbonate crystallization processes.

In the sodium sesquicarbonate processes the trona is dissolved in water or process liquors to form a solution of sodium sesquicarbonate and insolubles. Insolubles are separated by clarification or filtration, and sodium sesquicarbonate crystals are obtained from the clarified solution, usually by evaporative crystallization. The sodium sesquicarbonate crystals are then calcined to obtain soda ash.

In the sodium carbonate processes, the trona is first calcined, the calcined trona is dissolved in water or process liquors to obtain solution of sodium carbonate and insolubles. Insolubles are separated by clarification or filtration, and from the clarified solution the sodium carbonate may be obtained by crystallization in the form of anhydrous, monohydrate, heptahydrate or decahydrate crystals. The hydrated crystals are usually calcined to remove water of crystallization to obtain dense anhydrous soda ash.

It is also known to obtain sodium bicarbonate crystals from sodium carbonate or sodium sesquicarbonate solutions by introducing carbon dioxide into saturated or nearly saturated sodium sesquicarbonate or sodium carbonate solutions to precipitate the less soluble sodium bicarbonate. The sodium bicarbonate can also be transformed into sodium carbonate by calcination.

For purposes of the present invention, aqueous sodium carbonate process crystallizer mother liquor purge from the process of making sodium carbonate precursor crystals represents that portion of substantially saturated aqueous solutions from which sodium carbonate precursor crystals, i.e. sodium bicarbonate, sodium sesquicarbonate, anhydrous sodium carbonate, sodium carbonate monohydrate, sodium carbonate heptahydrate and sodium carbonate decahydrate have been crystallized as stable crystal phase, which portion of the mother liquor is withdrawn from the process in order to control or maintain levels of impurity contamination, e.g. contamination with soluble silicates, carbonaceous matter, sulfates and chlorides, within tolerable limits.

In a typical trona processing operation, a carbonate process solution which has been clarified and filtered is passed in series through crystallization units, typically "multiple effect" evaporator crystallizers. In general, three crystallizers or effects of known design are fed the carbonate process solution and the feed passes through the crystallizers in a chosen direction, generally first to the crystallizer operated at the highest temperature (first effect) then to the next crystallizer operated at a temperature lower than that in the first effect crystallizer. The "effects" are numbered in the direction of flow. As the carbonate process solution passes through the crystallizers, a slurry of sodium carbonate precursor crystals is formed and passed to each succeeding crystallizer. The slurry is passed from one effect to the other in the chosen direction by a series of pumps. From the last effect the slurry, containing about 15 to 60 percent solids, preferably about 30 to 50 percent solids, is allowed to settle. The sodium carbonate precursor crystals are separated from the mother liquor and the mother liquor is combined with the freshly filtered carbonate process solution which is to be fed to the crystallizer to effect crystallization of a second crop of precursor crystals.

Exemplary prior art crystallization procedures for the processing of trona solutions may be found in the disclosure of U.S. Pat. Nos. 2,704,239 (crystallization of sodium bicarbonate); 2,770,524 (crystallization of anhydrous sodium carbonate); 2,639,217 and 3,028,215 (crystallization of sodium sesquicarbonate); and 2,343,080, 2,343,081, 2,962,348, 3,131,996 and 3,260,567 (crystallization of sodium carbonate monohydrate.) In each of these prior art processes, the carbonate process solution generally first enters the crystallizer operated at highest temperature (first effect) and passes in series in the form of a slurry through the crystallizers, each succeeding one being operated at a lower temperature than the previous one. In the event the solids content of the slurry which is being pumped through the crystallizer unit becomes too thick or viscous, a portion of the slurry may be withdrawn and passed to a crystal separator. The slurry, after removal from the last of the multiple effect crystallizers, is separated into the sodium carbonate precursor crystals and the mother liquor, for instance by a centrifuge. The crystals are either dried and stored or passed to a dryer or calciner and converted to soda ash. The mother liquor is then recycled to the system passing through the first effect evaporator crystallizer together with clarified and filtered trona process solution not previously treated in the crystallizer. In some processes a portion of the mother liquor is used to dissolve additional trona. In each case, a part of the mother liquor is discarded as "purge" in order to maintain impurities within the recycled mother liquor at levels sufficiently low to meet soda ash product specifications with respect to impurities, e.g. silicate. In usual operation, between about 2% and about 10%, more generally between about 3% and 5% by weight of the recycled mother liquor must be purged in order to maintain produce quality.

In accordance with our invention, crystalizer mother liquor purge is evaporated to dryness and calcined in admixture with a treating agent selected from the group consisting of (1) magnesium oxide, (2) aluminum oxide, (3) buaxite, (4) fine particle size calcined trona which has been obtained by calcination of trona at temperature of from 125° to 600° C. and segregation of a fine particle size fraction therefrom substantially passing through 60 mesh screen (Tyler), and (5) insoluble impurities obtained by crushing crude trona, calcining the crushed trona, dissolving the calcined trona comprising sodium carbonate and insoluble impurities in an aqueous medium followed by separation of insoluble impurities, and (6) any mixture of the above.

Bauxite, fine particle size calcined trona, and insoluble impurities are preferred treating agents for reasons of availability. Magnesium oxide is preferably employed in conjunction with one or more of the above mentioned treating agents, preferably in conjunction with bauxite, fine particle size calcined trona or insoluble impurities, more preferably in conjunction with fine particle size calcined trona. The aluminum oxide, magnesium oxide and bauxite treating agents may be of any degree of purity, the usual commercial grades being eminently suitable.

Fine particle size calcined trona suitable for use in the process of the present invention may be obtained as follows: Crude trona is crushed to particle size predominantly smaller than 3 inches, preferably about 1/2 inch average diameter. It is then calcined at temperatures ranging from about 125° to 600° C., preferably at temperatures ranging from about 150° to 300° C. During or following the calcining operation, the trona is segregated into a fine particle size fraction having particle size of less than about 60 mesh (Tyler), preferably less than about 100 mesh, and into a corresponding coarse particle size fraction. An especially preferred fine particle size fraction calcined trona is that portion of the trona which during the calcination operation is entrained in the gases vented from the calciner and is collected in suitable dust separators in order to prevent its escape into the atmosphere. This fraction usually is of particle size less than about 80 mesh (Tyler); it is herein sometimes referred to as "calciner dust".

The insoluble impurities suitable for use in the method of the present invention are obtained as follows: Calcined trona obtained as described in the preceding paragraph, which may be the coarse as well as the fine particle size fractions combined, is dissolved in water or an aqueous medium, usually an aqueous sodium carbonate solution, generally at elevated temperature, to obtain a sodium carbonate solution containing insolubles. The insolubles are separated therefrom by any suitable method, such as sedimentation or filtration, or any combination thereof. For use in the method of the present invention, the insolubles so obtained may contain from about 0 to 50% of water, more preferably from about 5 to 10% by weight of water. The amount of water present in the insolubles is not critical, except that the water must be evaporated prior to calcination, and in order to conserve energy it is preferred to use insolubles containing as little water as is reasonably possible.

The mother liquor purge and the treating agent are mixed in ratios of from about 0.001 to 10 parts by weight, more preferably from about 0.5 to 2 parts by weight of treating agent per part mother liquor purge. Use of treating agent in amount of more than about 10 parts per part of mother liquor purge does not materially improve insolubilization of soluble silicates but adds to the amount of insolubles which remain in the following leaching operation. Hence, use of treating agent in such high amounts is preferably avoided. use of treating agent in amount of less than 0.001 parts by weight per part of mother liquor purge will usually be insufficient to effect substantial insolubilization of soluble silicates, and for that reason is not ordinarily preferred. The amount of treating agent required to obtain desired results depends also on the type of treating agent involved, as will become clear from discussion below of certain specific embodiments of our invention.

In one specific embodiment, we treat the mother liquor purge with from about 0.5 to 5, preferably about 1 to 4 parts by weight per part of mother liquor purge of fine particle size calcined trona which has been obtained by calcination of trona at temperatures of from about 125° to 600° C., and segregation of a fine particle size fraction therefrom passing substantially through 60 mesh screen (Tyler), together with 0.1 to 10 parts, preferably 0.5 to 5 parts by weight, based on the weight of the mother liquor purge, of magnesium oxide. We have found this combination of treating agents, namely fine particle size calcined trona and magnesium oxide, to be very effective in insolubilizing soluble silicates contained in the mother liquor purge. In this specific embodiment, it is particularly advantageous to first separate a crystal crop of sodium carbonate monohydrate or, preferably, of sodium carbonate decahydrate from the mother liquor purge prior to treatment with the fine particle size calcined trona and, optionally, the magnesium oxide as above described.

In another specific embodiment, we employ a treating agent combination comprising insoluble impurities together with bauxite, in weight ratio of insoluble impurities to bauxite of 3:1 to 60:1, preferably 5:1 to 20:1, which treating agent combination is employed in amount of 0.5 to 10 parts by weight, preferably 1 to 5 parts by weight of treating agent combination per part by weight of crystallizer mother liquor purge. The effectiveness of reducing soluble silicate content of this treating agent combination is synergistically enhanced, as will be demonstrated below.

Crystallizer mother liquor purge and treating agent can be mixed by any suitable means, e.g. by slurrying the treating agent in the crystallizer mother liquor purge under agitation in a stirred vessel. If purge and treating agents are mixed within the above-stated proportions, a pumpable slurry will usually result. Prior to calcination, the mixture of crystallizer mother liquor purge and treating agent is first evaporated to dryness. Any suitable means for removing the water from the mixture may be employed for that purpose. For example, the mixture may be dried in open pans or on any suitable apparatus designed to evaporate water to obtain solid residue, as for example, rotary driers, fluid bed driers or spray driers.

Similarly, calcination of the dry mixture may be effected in any equipment capable of bringing the dried mixture to the required calcination temperature and maintaining it there for the required amount of time to insolubilize soluble silicate and to reduce contamination with carbonaceous impurities. Desirably, evaporation to dryness and calcination are conducted as a single step in one piece of equipment. For example, the slurry of crystallizer mother liquor purge and treating agent may be dried and calcined by spraying it into a rotary furnace, which may be the furnace wherein trona is being calcined at the same time, which may be directly/indirectly fired, or a fluid bed dryer. Choice of equipment is not a critical consideration.

Calcination is conducted for time sufficient to insolubilize soluble silicates and to reduce contamination with carbonaceous impurities. Generally, this time period will be at least about 5 minutes, usually at least about 15 minutes. Suitable calcination times range from about 5 minutes to 3 hours, preferably about 15 minutes to 2 hours. Calcination times in excess of about 3 hours are wasteful of energy and are, for that reason, desirably avoided.

The following Examples, wherein parts are by weight unless otherwise indicated, illustrate the present invention and set forth the best mode presently contemplated for its practice.

The following general procedure was employed in the Examples and Comparative Tests shown below.

Crystallizer purge liquor and finely divided treating agents (passing through 60 mesh screen (Tyler)) were mixed to form a slurry. This slurry was evaporated to dryness, and the dried residue was calcined at the indicated temperature for the indicated time in a stainless steel tray in a muffle furnace.

Following calcination, the calcined mixture was dissolved in deionized water contained in a stainless steel beaker immersed in an oil bath maintained at 90° C. with thermostatic control. The beaker was equipped with stirrer and cover. When the temperature of the water reached 75° C., the calcined mixture was added in amount calculated to give 28% $Na_2CO_3$ solution. The temperature of the water reached 90° C. because of the exothermic hydration reaction. After 30 minutes, a 50 ml portion of the solution was withdrawn and filtered through a Whatman No. 42 filter into 50 ml of water.

Soluble silicate was determined photometrically. For high silicate levels (5000 ppm $SiO_2$, basis $Na_2CO_3$ or above) the sample was acidified to pH 1.4 and ammonium molybdate was added to form the yellow complex. The absorbance was measured at 410 millimicrons. For lower silicate levels the yellow complex was reduced with 1-amino-2-naphthol-4-sulfonic acid to molybdenum blue and the measurement was made at 660 millimicrons. The silicate concentrations were read off appropriate standard curves.

Soluble carbonaceous matter was determined as carbon by oxidizing it to carbon dioxide. Carbonate (inorganic carbon) was first removed by acidification and boiling. The carbonaceous matter (organic carbon) was then oxidized to carbon dioxide using silvercatalyzed potassium persulfate in sulfuric acid, and the evolved $CO_2$ was absorbed in standardized potassium hydroxide solution to form potassium carbonate. The carbonate ion was precipitated as barium carbonate by addition of barium chloride, and the unreacted potassium hydroxide was titrated with hydrochloric acid to the phenolphthalein endpoint. The amount of organic carbon in the sample was calculated from the amount of potassium hydroxide consumed by the evolved carbon dioxide.

EXAMPLES 1 TO 8

Crystallizer purge liquor containing 2,655 ppm soluble silicates, expressed as $SiO_2$, and 794 ppm of carbonaceous impurities, expressed as C, was mixed with insolubles which had been obtained by crushing crude trona, calcining the crushed trona at temperature of about 200° C., dissolving the calcined trona comprising sodium carbonate and insoluble impurities in an aqueous medium, followed by separation of insoluble impurities (Examples 3, 5 and 8), with bauxite (Example 1) or with both such insoluble impurities and bauxite (Examples 2, 4, 6 and 7). The mixture was evaporated to dryness, followed by calcination at 500° C. for 45 minutes. Content of soluble silicates (expressed as ppm $SiO_2$) and carbonaceous matter (expressed as ppm C) were determined on the aqueous solution as described above. Results are summarized in Table I, below.

TABLE I

| Example | Treating Agent % Insolubles* | Treating Agent % Bauxite* | $SiO_2$, ppm (basis solution) | Carbon, ppm (basis solution) |
|---|---|---|---|---|
| 1 |  | 1.0 | 1062 | 5 |
| 2 | 2.0 | 0.5 | 1239 | 9 |
| 3 | 3.0 |  | 1469 | 19 |
| 4 | 3.0 | 1.0 | 46 | 14 |
| 5 | 6.0 |  | 710 | 9 |
| 6 | 6.0 | 0.1 | 530 | N.A. |
| 7 | 8.0 | 0.3 | 300 | 18 |
| 8 | 10.0 |  | 250 | 10 |

*Percent by weight, based on the weight of the sodium cabonate crystallizer mother liquor purge liquor.

EXAMPLES 9 to 14

The procedure of Examples 1 to 8 was repeated using sodium carbonate crystallizer mother liquor purge containing 4800 ppm soluble soluble silicates, expressed as $SiO_2$, and 1099 ppm carbonaceous matter, expressed as C. Results are summarized in Table II, below.

TABLE II

| Example | Treating Agent % Insolubles* | Treating Agent % Bauxite* | $SiO_2$, ppm (basis solution) | Carbon, ppm (basis solution) |
|---|---|---|---|---|
| 9 |  | 1.0 | 4070 | 30 |
| 10 |  | 2.0 | 2300 | 5 |
| 11 | 2.0 | 0.5 | 3200 | 5 |
| 12 | 3.0 |  | 3000 | 5 |
| 13 | 3.0 | 1.0 | 2500 | 9 |
| 14 | 6.0 | 2.0 | 170 | 12 |

*Percent by weight, based on the weight of the sodium carbonate crystallizer mother liquor purge.

EXAMPLES 15 to 18

Example 7 was repeated using the same sodium carbonate crystallizer mother liquor purge as was used in that Example, 8.0% insolubles and 0.3% bauxite in combination as treating agent, but conducting calcination at temperatures of 400° C. (Examples 15 and 16), 450° C. (Example 17) and 550° C. (Example 18). At the 400° C. calcination temperature calcination times of 45 minutes (Example 15) and 90 minutes (Example 16) were employed. Results are summarized in Table III, below.

TABLE III

| Example | Calcination Temp. (° F.) | Calcination Time (min) | $SiO_2$, ppm (basis solution) | Carbon, ppm (basis solution) |
|---|---|---|---|---|
| 15 | 400 | 45 | 94 | 258 |
| 16 | 400 | 90 | 88 | 92 |
| 17 | 450 | 45 | 65 | 48 |
| 18 | 550 | 45 | 1587 | 9 |

EXAMPLES 19 to 23

The procedure of Examples 1 to 8 was repeated using sodium carbonate crystallizer mother liquor purge containing 2610 ppm soluble silicates, expressed as $SiO_2$, and 760 ppm carbonaceous matter, expressed as C. Results are summarized in Table IV, below:

TABLE IV

| Example | Treating Agent % Insolubles* | Treating Agent % Bauxite* | $SiO_2$, ppm (basis solution) | Carbon, ppm (basis solution) |
|---|---|---|---|---|
| 19 | 0 | 0 | 2200 | 5 |
| 20 | 0 | 0.3 | 1940 | 18 |
| 21 | 0 | 0.6 | 1440 | 10 |
| 22 | 3 | 0 | 750 | 10 |
| 23 | 3 | 1 | 67 | 12 |

*Percent by weight, based on the weight of the sodium carbonate crystallizer mother liquor purge liquor.

EXAMPLE 24

100 Parts of crystallizer mother liquor purge containing about 2,400 ppm soluble silicates, expressed as $SiO_2$, and 690 ppm of carbonaceous impurities, expressed as C were mixed with one part of magnesium oxide and 200 parts of fine particle size calcined trona containing about 2000 ppm soluble silicates, expressed as $SiO_2$, and 170 ppm soluble carbonaceous impurities, expressed as C (both basis $Na_2CO_3$). The fine particle size calcined trona had been obtained by calcination of trona at temperature of about 200° C. and segregation of a fine particle size fraction therefrom substantially passing through 80 mesh screen (Tyler). Purge and additives were mixed, the mixture was brought to dryness at about 180° C. and the dry mixture was heated at 500° C. for ½ hour in a muffle furnace. 160 Parts of the calcined product were mixed with 450 parts of coarse particle size calcined trona being retained on 80 mesh screen (Tyler) and the mixture was dissolved in 1250 parts of water to obtain a solution of approximately 30% by weight of sodium carbonate. This solution was stirred and maintained at 90° C. 100 Milliliter samples of the liquor were withdrawn at intervals of 30, 60 and 180 minutes and were analyzed for $SiO_2$ and carbon. It was found that the soluble silicates, expressed as $SiO_2$, and carbonaceous impurities remained constant at about 64 ppm $SiO_2$ and 41 ppm C.

When portions of the fine particle size calcined trona and of the coarse particle size calcined trona employed in Example 24 were mixed in the same proportions as in that Example, followed by dissolution in water and maintaining the solution under stirring at 90° C., the resulting liquor was found to contain about 249 ppm $SiO_2$ and 48 ppm C.

EXAMPLES 25 to 27

The procedure of Example 24 was repeated using crystallizer mother liquor purge containing 2070 ppm soluble silicates, expressed as $SiO_2$, and 635 ppm of carbonaceous impurities, expressed as C. The fine particle size calcined trona employed contained soluble silicates and carbonaceous impurities in such amounts that a solution of the fine particle size calcined trona containing about 28% $Na_2CO_3$ contained 650 ppm soluble silicates, expressed as $SiO_2$, and 50 ppm carbonaceous impurities, expressed as C. Results are summarized in Table V below. In Example 25 the only additive used is fine particle size calcined trona whereas Example 26 employs fine particle size calcined trona together with bauxite, and Example 27 employs fine particle size calcined trona together with magnesium oxide.

TABLE V

| Ex. | Purge Liquor Parts by Wt. | Fine Particle Size Calcined Trona Parts by Wt. | MgO, Parts by Wt. | Bauxite, Parts by Wt. | $SiO_2$, ppm (basis solution) | C, ppm (basis solution) |
|---|---|---|---|---|---|---|
| 25 | 100 | 200 | | | 329 | 23 |
| 26 | 100 | 200 | | 2.0 | 318 | 25 |
| 27 | 100 | 200 | 0.5 | | 96 | 21 |

When in the above Examples other treating agents within the purview of the present invention are used, single or in combination, within the broad proportions contemplated by us, then similar results are obtained, that is to say in each instance there is obtained reduction of soluble silicates and carbonaceous matter so that purified sodium carbonate can be recovered from the sodium carbonate crystallizer mother liquor purge suitable for re-routing to the process for making sodium carbonate precursor crystals from which the purge liquor had been obtained.

Since various changes may be made in carrying out the process of our invention without departing from its scope or essential characteristics, all matter contained in the above description shall be interpreted as illustrative only and not in a limiting sense, the scope of the invention being defined by the appended claims.

We claim:

1. The method of recovering soda values from aqueous carbonate process crystallizer mother liquor purge containing soluble silicates and carbonaceous impurities from the process for making sodium carbonate precursor crystals, which comprises:
   a. mixing the mother liquor purge with from about 1 to 10 parts by weight, per part of mother liquor purge, as treating agent of insoluble impurities obtained by crushing crude trona, calcining the crushed trona, dissolving the calcined trona comprising sodium carbonate and insoluble impurities in an aqeuous medium followed by separation of insoluble impurities;
   b. evaporating the mixture to dryness and calcining at temperature of 300° to 600° C. for time sufficient to insolubilize soluble silicates and to reduce contamination with carbonaceous impurities; and
   c. leaching the calcined mixture with water or aqueous sodium carbonate solution to recover sodium carbonate values therefrom.

2. The metbhod of claim 1 wherein the treating agent comprises, in combination, insoluble impurities together with bauxite in weight ratio of 3:1 to 60:1 insoluble impurities to bauxite, and is employed in amount of 0.5 to 10 parts by weight of treating agent per part of crystallizer mother liquor purge.

3. The method of claim 2 with the additional step of subjecting the leach liquor containing recovered sodium carbonate values to cooling and/or evaporation to crystallize sodium carbonate decahydrate crystals therefrom, and recovering the sodium carbonate decahydrate crystals.

4. The method of claim 2 wherein the aqueous carbonate process crystallizer mother liquor purge is an aqueous sodium carbonate solution which, prior to mixing it with the treating agent, is cooled and/or evaporated to crystallize and separately recover sodium carbonate monohydrate or sodium carbonate decahydrate crystals therefrom.

5. The method of claim 1 with the additional step of subjecting the leach liquor containing recovered sodium carbonate values to cooling and/or evaporation to crystallize sodium carbonate decahydrate crystals therefrom, and recovering the sodium carbonate decahydrate crystals.

6. The method of claim 1 wherein in step (a) said insoluble impurities are employed in amount of about 1 to 10 parts by weight per part of mother liquor purge together with 0.1 to 2 percent by weight based on the weight of the mother liquor purge of bauxite.

* * * * *

UNITED STATES PATENT OFFICE
CERTIFICATE OF CORRECTION

Patent No. 4,044,097　　　　　　　　Dated August 23, 1977

Inventor(s) Alan B. Gancy and Rustom P. Poncha

It is certified that error appears in the above-identified patent and that said Letters Patent are hereby corrected as shown below:

Col. 1, line 22: Comma between $CaCO_3$ and $MgCO_3$ should be a period.
Col. 3, line 62: "1 parts" should be "10 parts".
Col. 4, line 17: "then" should be "the".
Col. 6, line 11: "produce" should be "product".
　　　　 line 12: "crystalizer" should be "crystallizer".
　　　　 line 16: "buaxite" should be "bauxite".
　　　　 line 60: between "fractions" and "combined" - insert ", or both fractions".
Col. 7, line 15: "use" should be "Use".
Col. 12, line 10: "metbhod" should be "method".

Signed and Sealed this

Twenty-third Day of May 1978

[SEAL]

Attest:

RUTH C. MASON　　　　　　　　LUTRELLE F. PARKER
Attesting Officer　　　　Acting Commissioner of Patents and Trademarks